(12) United States Patent
Thommána et al.

(10) Patent No.: US 7,940,831 B1
(45) Date of Patent: May 10, 2011

(54) DIRECT SEQUENCE SPREAD SPECTRUM SYSTEM AND METHOD THEREOF

(75) Inventors: John Thommána, Cedar Rapids, IA (US); Roy C. Moore, Cedar Rapids, IA (US); Lizy Paul, Cedar Rapids, IA (US); Steven J. Zaugg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 821 days.

(21) Appl. No.: 11/985,215

(22) Filed: Nov. 14, 2007

(51) Int. Cl.
*H04B 1/69* (2011.01)
*H04B 1/707* (2011.01)
*H04B 1/713* (2011.01)

(52) U.S. Cl. ........ 375/141; 375/140; 375/146; 375/147; 375/130; 379/202.01; 370/393; 370/394; 370/441; 370/335; 370/342

(58) Field of Classification Search .................. 375/130, 375/140, 141, 146, 147; 379/202.01; 370/393, 370/394, 395, 335, 342, 441, 293, 395.1
See application file for complete search history.

(56) References Cited

U.S. PATENT DOCUMENTS

| 7,760,790 B2 * | 7/2010 | Baum et al. .................. 375/130 |
| 2005/0213734 A1 * | 9/2005 | Rodman ................. 379/202.01 |

* cited by examiner

*Primary Examiner* — Phuong Phu

(74) *Attorney, Agent, or Firm* — Matthew J. Evans; Daniel M. Barbieri

(57) ABSTRACT

A method for a direct sequence spread spectrum communication system comprises encoding a first signal of data in a communication channel, embedding a second signal of data as notches in the communication channel, transmitting the first signal of data and the second signal of data concurrently and at a substantially same rate across the communication channel, receiving the communication channel, decoding the first signal of data in the communication channel to interpret the first signal of data, and bit decoding the second signal of data in the communication channel to interpret the second signal of data.

12 Claims, 6 Drawing Sheets

DIRECT SEQUENCE SPREAD SPECTRUM SYSTEM AND METHOD THEREOF

TECHNICAL FIELD

The present invention generally relates to the field of communication systems, and more particularly to direct sequence spread spectrum communication systems.

BACKGROUND

Direct sequence spread spectrum (DS-SS) communication systems are utilized to send a signal of input data across a channel of communication by spreading the input data by a high rate spreading code to create a coded data channel. The DS-SS is a modulation technique that transmits a signal that takes up more bandwidth than the information signal that is being modulated. A DS-SS communication system may provide a single signal of data with a low probability of detection and a low probability of interception.

SUMMARY

The disclosure is directed to a direct sequence spread spectrum communication system and method thereof.

The direct sequence spread spectrum communication system comprises a first signal of data encoded in a communication channel, a second signal of data embedded as notches in the communication channel, a transmitter suitable for transmitting the first signal of data and the second signal of data concurrently and at a substantially same rate across the communication channel, and a receiver suitable for receiving the first signal of data and the second signal of data in the communication channel. The first signal of data is decoded and the second signal of data is bit decoded for interpretation The method for a direct sequence spread spectrum communication system comprises encoding a first signal of data in a communication channel, embedding a second signal of data as notches in the communication channel, transmitting the first signal of data and the second signal of data concurrently and at a substantially same rate across the communication channel, receiving the communication channel, decoding the first signal of data in the communication channel to interpret the first signal of data, and bit decoding the second signal of data in the communication channel to interpret the second signal of data.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
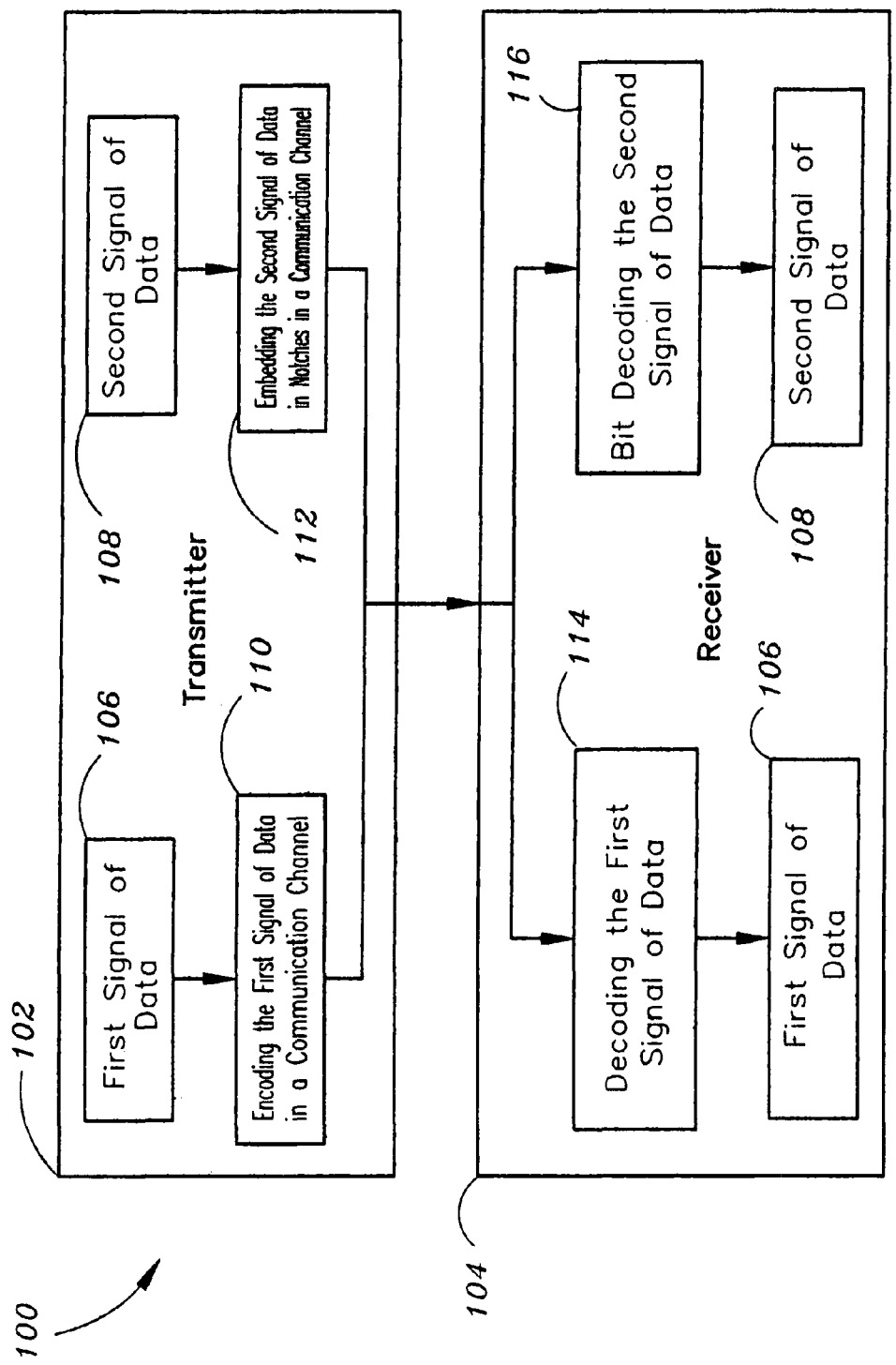
FIG. 1 is a block diagram illustrating a direct sequence spread spectrum (DS-SS) communication system comprising a first signal of data and second signal of data in a communication channel.

Referring to FIGS. 1 through 5, a direct sequence spread spectrum (DS-SS) communication system 100 is shown. The DS-SS communication system 100 is suitable for communicating two signals of data concurrently across one communication channel. The DS-SS communication system 100 may send at least double the amount of data compared to previously utilized DS-SS communication systems that only utilize one signal of data.

The DS-SS communication system 100 may be a Mobile User Objective System (MUOS). The MUOS may spread data by utilizing a 3.84 Mcps spreading code to occupy a 5 MHz wide channel. The MUOS coexists with other narrowband users by sending a bitmask of frequencies to be avoided. The MUOS scans the transmit frequencies at regular intervals of time to identify local narrowband transmitters. The MUOS performs a 1024 point FFT over the 5 MHz band to detect individual 5 KHz wide interferers in order to notch the individual 5 KHz interferers out. The MUOS then notches out the interfering bands prior to transmission to avoid interfering with the local narrowband users in the band.

The DS-SS communication system 100 comprises a transmitter 102, a receiver 104, a communication channel, a first signal of data 106, and a second signal of data 108.

The communication channel is suitable for the communication of a first signal of data 106 and a second signal of data 108.

The transmitter 102 may be suitable for encoding the first signal of data into the communication channel 110 by multiplying the first signal of data being transmitted by a "noise" signal. However, another component may be utilized for encoding the first signal of data 106, such as a computer, a microprocessor, or any other suitable device for encoding a signal of data. The noise signal may be a pseudorandom sequence at a frequency much higher than that of the first signal of data, thereby spreading the energy of the first signal of data 106 into a much wider band. This process creates a resulting first signal of data 106 that resembles white noise to provide a first signal of data with a low probability of interception and a low probability of detection.

Figure 2:
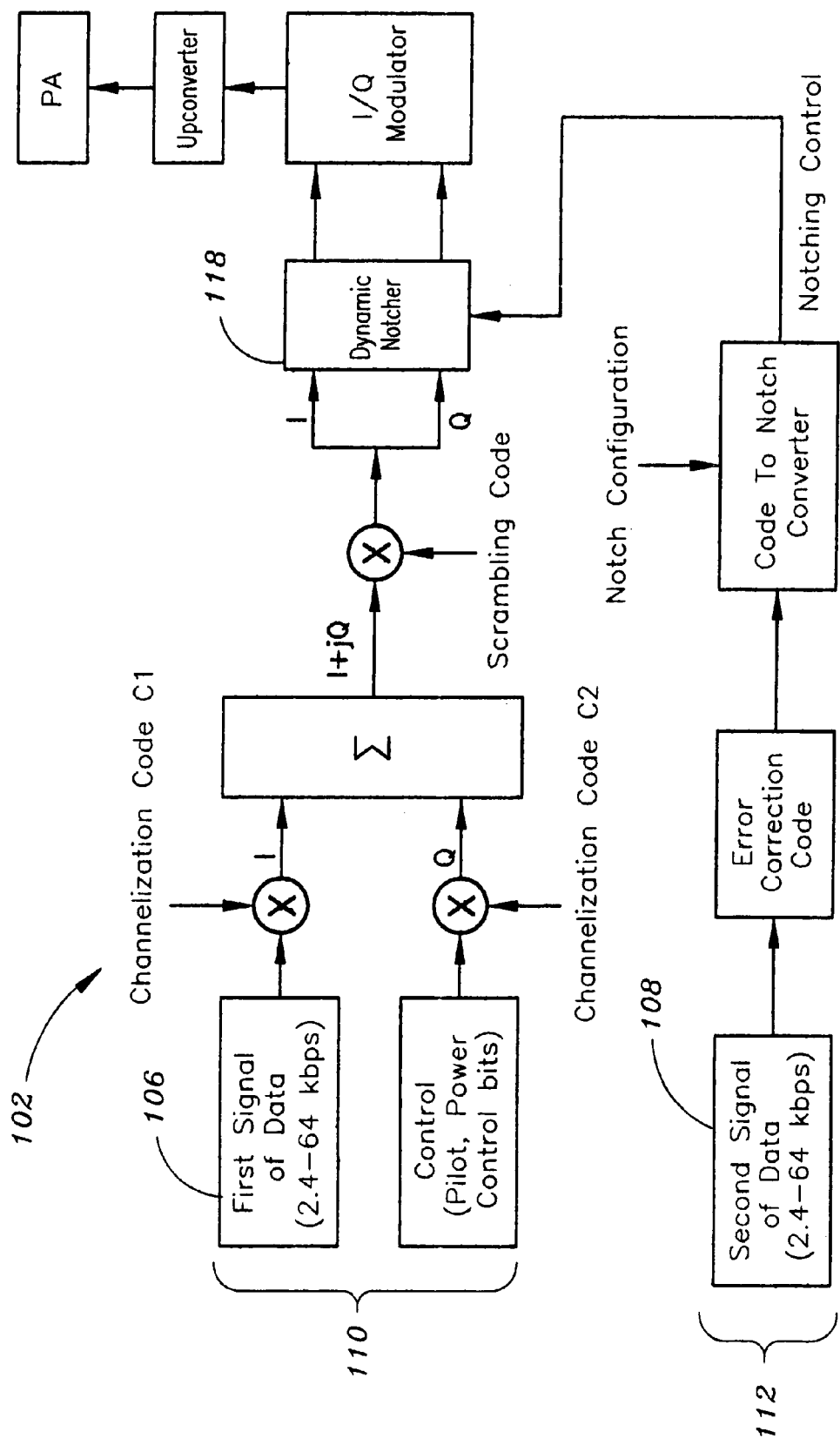
FIG. 2 is a block diagram of a transmitter of the DS-SS communication system illustrated in FIG. 1.

The transmitter 102 may be suitable for embedding the second signal of data as notches in the communication channel 112, as illustrated in FIG. 2. However, another component may be utilized for embedding the second signal of data 108 in notches, such as a computer, a microprocessor, or any other suitable device for encoding a signal of data. The notches may have fixed or variable widths, but the amount of notching may be less than 25%. Five kHz bins at specific frequencies may be notched in every input data bit duration where one notch represents the data and the remaining four notches are utilized for error correction creating a loss of 25 kHz in a 5 MHz band. The 5 kHz band loss may be treated as normal narrow band fades. Therefore, this process results in a second signal of data 108 that is indistinguishable from normal narrowband fades.

The data of the second signal 108 has at least substantially the same low probability of interception and low probability of detection as the data of the first signal. The second signal of data 108 may have a lower probability of interception and lower probability of detection as the first signal of data 106 because the notches in the 5 MHz band may make the second signal of data 108 indistinguishable from normal narrow band fades. Moreover, the integrity of the first signal of data is not substantially compromised by the transmission of the second signal of data.

The transmitter 102 may be suitable for transmitting the second signal when a current spectral notching requirement is about 600 kHz or less in a 5 MHz band. The transmitter 102 may be suitable for transmitting the second signal of data with two data bits per data bit when the current spectral notching requirement is about 300 kHz or less in a 5 MHz band. Moreover, the transmitter 102 may be suitable for transmitting the second signal of data with one data bit per data bit when the current spectral notching requirement is between about 300 kHz and about 600 kHz in a 5 MHz band.

Figure 3:
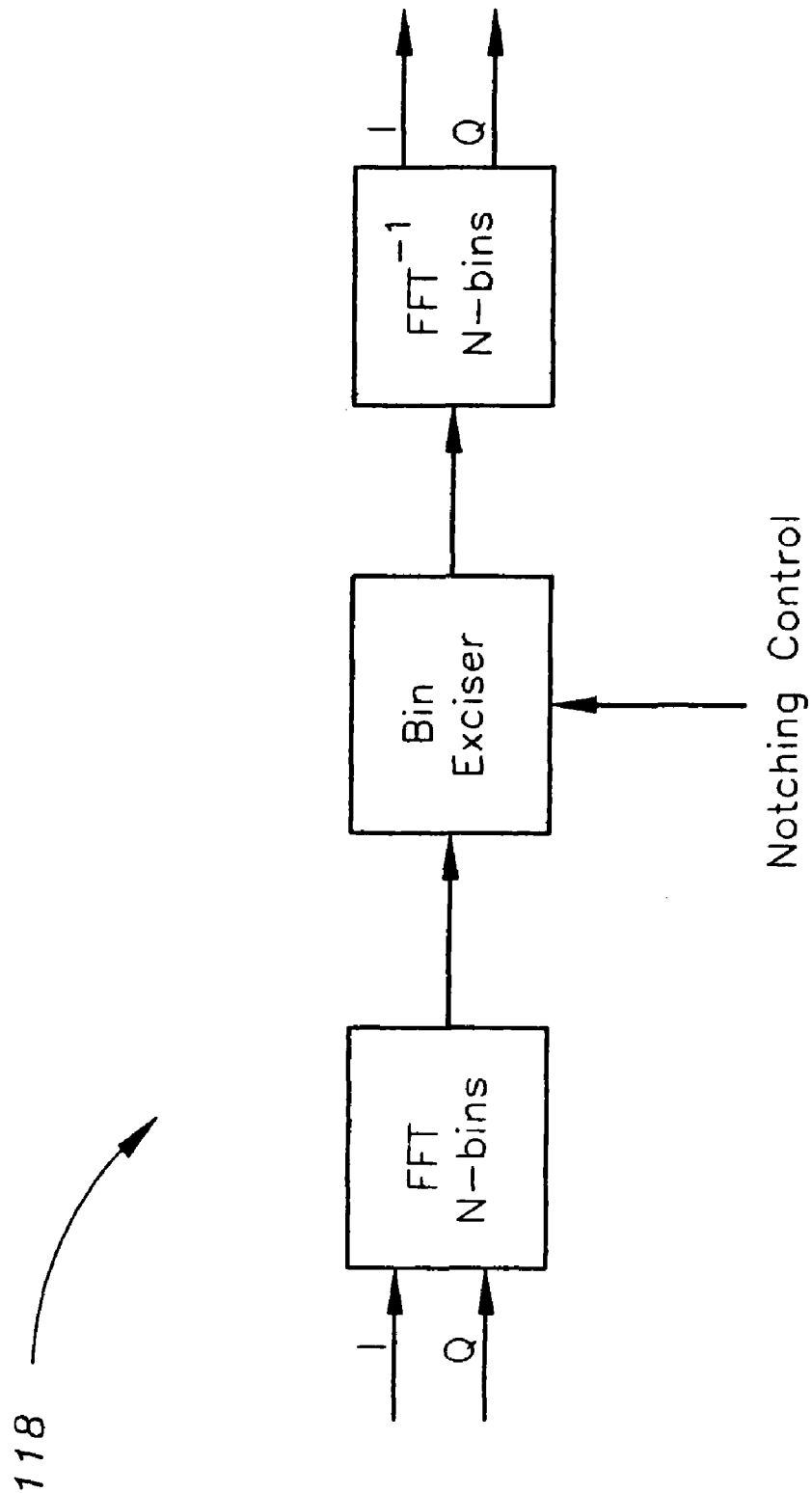
FIG. 3 is a block diagram of the dynamic notcher of the transmitter illustrated in FIG. 2.

The transmitter 102 is suitable for transmitting the first signal of data 106 and a second signal of data concurrently and at substantially the same rate across the communication channel. Both the first signal of data 106 after encoding 110 and the second signal of data 108 after embedding 112 are sent through a dynamic notcher 118 before transmission, as illustrated in FIGS. 2 and 3.

The notching of the second signal may comprise embedding the second signal of data as a function of notch separation distance within the data bit. The notching of the second signal may comprise embedding the second signal of data as a function of time. The resulting notched signal when embedding the second signal of data as function of time results in the average notches per data bit being nearly constant but every data bit will have a varying number of notches controlled by a pseudonoise sequence (PN).

The notching of the second signal may comprise embedding the second signal of data as a function of data bit error or a function of data block error rate. The notching of the second signal may comprise embedding the second signal of data as a function of notch width with the notch width being controlled by a pseudonoise sequence. The notching of the second signal may comprise embedding the second signal of data as a function of the input data. The resulting notched signal when embedding the second signal of data as a function of the input data results in a data period that decreases thereby reducing the amount of notches that can be added in a data bit without increasing the probability of bit error as the data rate of the first signal increases.

The notching of the second signal may comprise embedding the second signal of data as a function of spectral re-growth components. The introduction of specific widths or inter-notch distances will cause spectral re-growth due to the non-linearities of a power amplifier.

Figure 4:
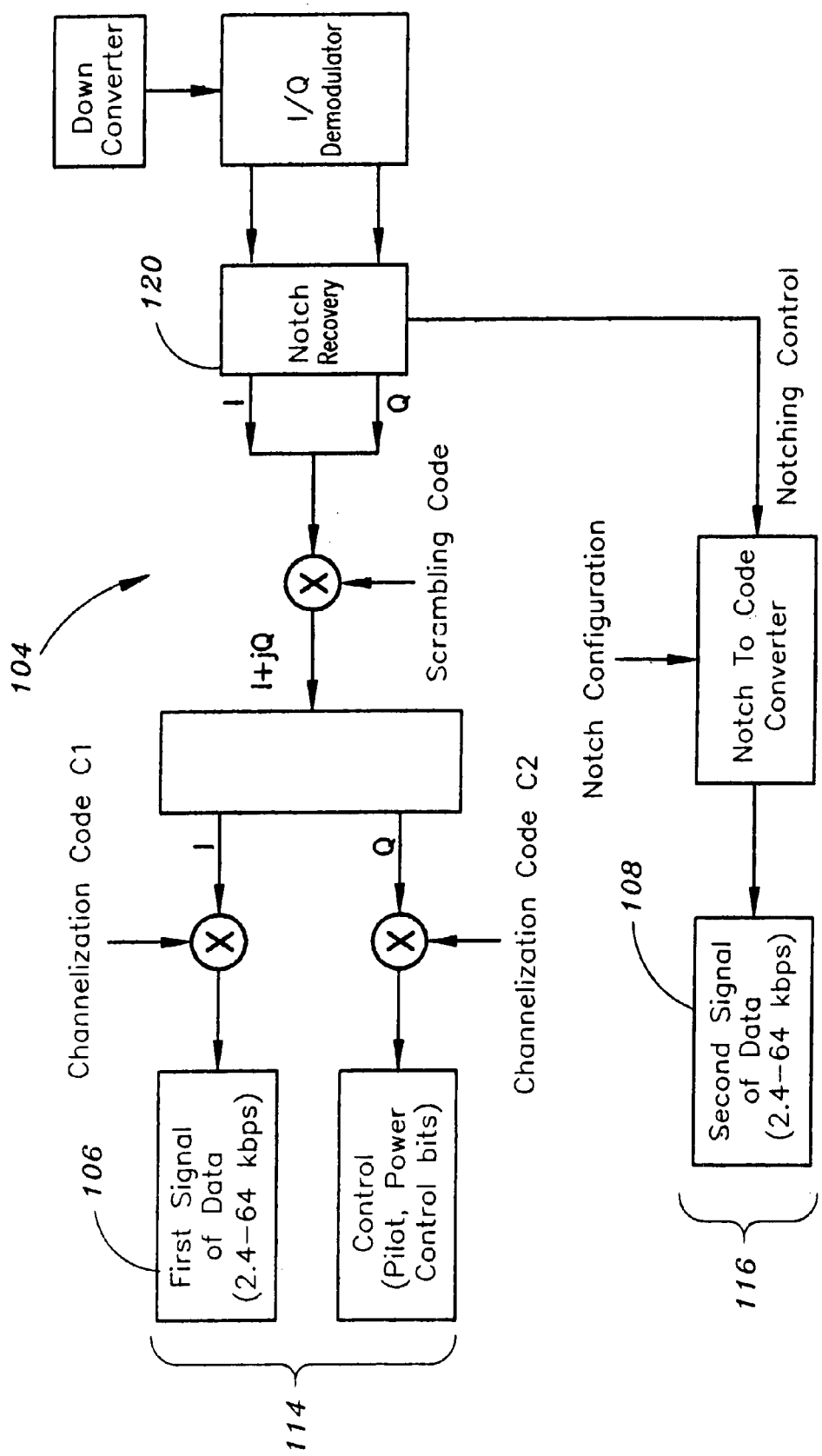
FIG. 4 is a block diagram of a receiver of the DS-SS communication system illustrated in FIG. 1.
Figure 5:
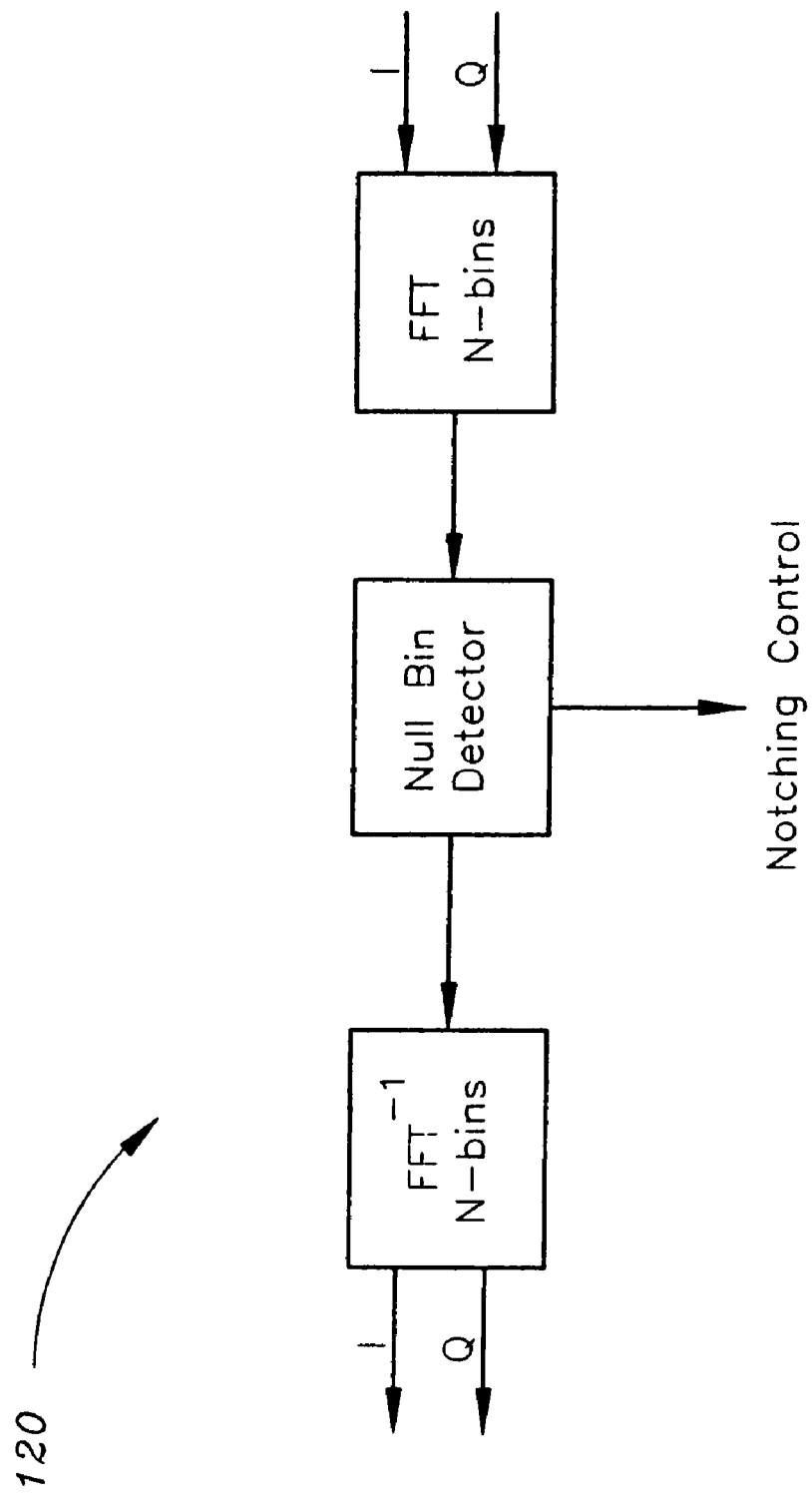
FIG. 5 is a block diagram of the notch recovery of the receiver illustrated in FIG. 4.

The receiver 104 is suitable for receiving both the first signal of data 106 and the second signal of data 108 in the communication channel, as illustrated in FIG. 4. The receiver 104 may be suitable for decoding the first signal of data of the communication channel to interpret the first signal of data 106. The receiver 104 may be suitable for bit decoding the second signal of data of the communication channel to interpret the second signal of data 108. However, another component may be utilized for decoding and/or bit decoding the first signal of data 106 and the second signal of data 108, such as a computer, a microprocessor, or any other suitable device for decoding and/or bit decoding a signal of data. The receiver 104 utilizes a notch recovery 120 to retrieve both the first signal of data 106 and the second signal of data 108, as illustrated in FIGS. 4 and 5.

The second signal of data 108 may be utilized for in-band power control, dynamic ciphering, secure key exchange management, additional error correction channel applications, or any other suitable applications for the utilization of additional data. The second signal of data may be suitable for utilization with a MUOS spectral adaptation as an additional exclusive or degree function.

Figure 6:
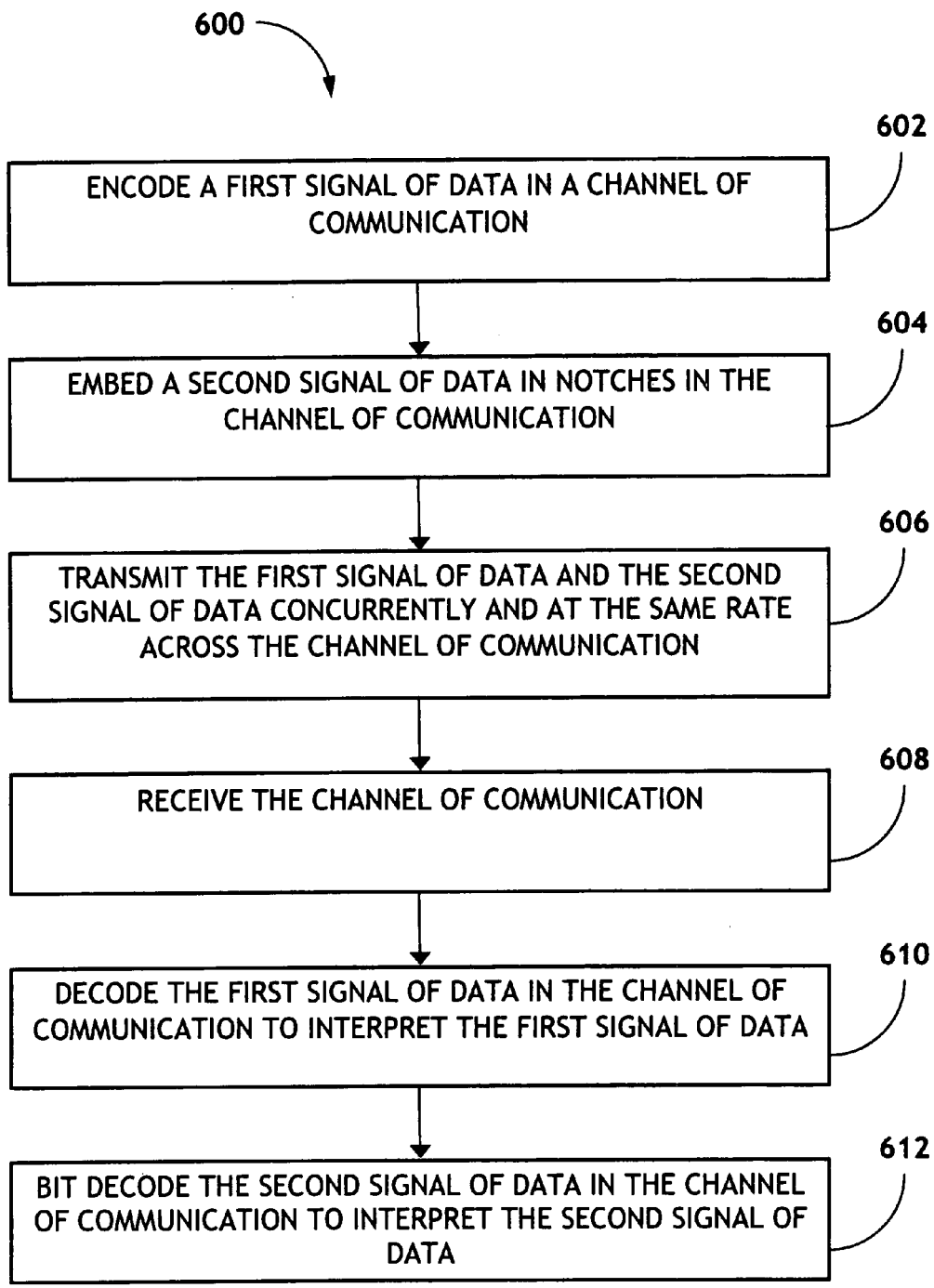
FIG. 6 is a block diagram of a method for a direct sequence spread spectrum (DS-SS) communication system.

Referring to FIG. 6 a method for a direct sequence spread spectrum (DS-SS) communication system 600 is shown. Method 600 encodes a first signal of data in a communication channel, 602. Method 600 embeds a second signal of data as notches in the communication channel, 604. Method 600 transmits the first signal of data and the second signal of data concurrently and at substantially the same rate across the communication channel, 606. Method 600 receives the communication channel, 608. Method 600 decodes the first signal of data in the communication channel to interpret the first signal of data, 610. Method 600 bit decodes the second signal of data in the communication channel to interpret the second signal of data, 612. Method 600 may be executed by the DS-SS communication system 100 of FIGS. 1 through 5.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the present invention and many of its attendant advantages wilt be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A direct sequence spread spectrum communication system comprising:
    a first signal of data encoded in a communication channel;
    a second signal of data embedded as notches in the communication channel, the second signal of data being embedded as a function of notch width with the notch width being controlled by a pseudonoise sequence;
    a transmitter suitable for transmitting the first signal of data and the second signal of data concurrently and at a substantially same rate across the communication channel; and
    a receiver suitable for receiving the first signal of data and the second signal of data in the communication channel, wherein the first signal of data is decoded and the second signal of data is bit decoded for interpretation.

2. The direct sequence spread spectrum communication system as claimed in claim 1, wherein the notches comprise at most about 25% of the communication channel.

3. The direct sequence spread spectrum communication system as claimed in claim 1, wherein the second signal of data is embedded in a format selected from a group of a function of notch separation distance within the data bit, a function of time, a function of input data rate, a function of data bit error rate, a function of data block error rate, and a function of spectral re-growth components.

4. The direct sequence spread spectrum communication system as claimed in claim 1, wherein the direct sequence spread spectrum communication system is a Mobile User Objective System.

5. The direct sequence spread spectrum communication system as claimed in claim 1, wherein the transmitter is suitable for sending the second signal when a current spectral notching requirement is at most about 600 kHz in a 5 MHz band.

6. The direct sequence spread spectrum communication system as claimed in claim 1, wherein the second signal of data may be utilized in applications selected from a group of in-band power control, dynamic ciphering, secure key exchange management, and additional error correction channel.

7. A method for signal handling via a direct sequence spread spectrum communication system, said method comprising:
    encoding, via an encoding component of the system, a first signal of data in a communication channel;
    embedding, via an embedding component of the system, a second signal of data as notches in the communication channel;
    transmitting, via a signal transmitter component of the system, the first signal of data and the second signal of data concurrently and at a substantially same rate across the communication channel;
    receiving, via a signal receiver component of the system, the communication channel;
    decoding, via a decoding component of the system, the first signal of data in the communication channel to interpret the first signal of data; and
    bit decoding, via the decoding component of the system, the second signal of data in the communication channel to interpret the second signal of data, the decoding device being one of: the signal receiver component, a computer, and a microprocessor,
    wherein the embedding the second signal of data in the notches in the communication channel comprises embedding the second signal of data as a function of notch width with the notch width being controlled by a pseudonoise sequence.

8. The method as claimed in claim 7, wherein the notches comprise at most about 25% of the communication channel.

9. The method as claimed in claim 7, wherein the embedding the second signal of data in the notches in the communication channel comprises embedding the second signal of data in a format selected from a group of a function of notch separation distance within the data bit, a function of time, a function of input data rate, a function of data bit error rate, a function of data block error rate, and a function of spectral re-growth components.

10. The method as claimed in claim 7, wherein the method for signal handling is utilized in a Mobile User Objective System.

11. The method as claimed in claim 7, wherein a current spectral notching requirement is at most about 600 kHz in a 5 MHz band.

12. The method as claimed in claim 7, further comprising utilizing the second signal of data in applications selected from a group of in-band power control, dynamic ciphering, secure key exchange management, and additional error correction channel.

* * * * *